United States Patent
Ge et al.

(10) Patent No.: US 12,449,170 B2
(45) Date of Patent: Oct. 21, 2025

(54) LIQUID ACCUMULATOR AND HEAT EXCHANGE SYSTEM HAVING LIQUID ACCUMULATOR

(71) Applicant: ZHEJIANG DUNAN ARTIFICIAL ENVIRONMENT CO., LTD., Shaoxing (CN)

(72) Inventors: Yankai Ge, Shaoxing (CN); Pengfei Liao, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 446 days.

(21) Appl. No.: 18/072,663

(22) Filed: Nov. 30, 2022

(65) Prior Publication Data

US 2023/0092213 A1    Mar. 23, 2023

Related U.S. Application Data

(63) Continuation of application No. PCT/CN2021/093742, filed on May 14, 2021.

(30) Foreign Application Priority Data

Jun. 8, 2020  (CN) .......................... 202010513157.X (51) Int. Cl.
  *F25B 43/00* (2006.01)
  *B01D 29/01* (2006.01)
  *F16K 15/02* (2006.01)

(52) U.S. Cl.
  CPC .......... *F25B 43/006* (2013.01); *B01D 29/014* (2013.01); *F16K 15/028* (2013.01); *F25B 43/003* (2013.01)

(58) Field of Classification Search
  CPC .. F25B 43/006; F25B 43/003; F25B 2500/26; F25B 41/20; F25B 43/00; F25B 49/02; F25B 2400/23; B01D 29/014; F16K 15/028; F16K 15/00; Y02E 60/14; F24F 13/30
  See application file for complete search history.

(56) References Cited

FOREIGN PATENT DOCUMENTS

| | | | | |
|---|---|---|---|---|
| CN | 101440885 A | * | 5/2009 | |
| CN | 208365880 U | | 1/2019 | |
| CN | 110905803 A | | 3/2020 | |
| CN | 111173712 A | | 5/2020 | |
| CN | 210441470 U | | 5/2020 | |
| CN | 111238097 A | * | 6/2020 | ................ F25B 1/00 |
| JP | H0968371 A | | 3/1997 | |

OTHER PUBLICATIONS

International Search Report of PCT/CN2021/093742.

\* cited by examiner

*Primary Examiner* — Waqaas Ali (57) ABSTRACT

A liquid accumulator and a heat exchange system having the liquid accumulator are provided. The liquid accumulator includes a barrel body and a one-way valve, and the one-way valve is disposed in the barrel body. The one-way valve includes a valve seat and a valve plate, the valve seat is provided with a valve port, a side of the valve seat towards the outlet end is provided with the valve plate, the valve port is covered by the valve plate. And a protrusion is located surrounding the valve port and the valve plate is capable of moving towards or away from the valve port, so as to open or close the one-way valve.

12 Claims, 5 Drawing Sheets

LIQUID ACCUMULATOR AND HEAT EXCHANGE SYSTEM HAVING LIQUID ACCUMULATOR

CROSS-REFERENCE TO RELATED APPLICATIONS

This application is a continuation of international PCT patent application PCT/CN2021/093742 filed on May 14, 2021, which claims all benefits accruing under 35 U.S.C. § 119 from China Patent Application No. 202010513157.X, filed on Jun. 8, 2020, titled "LIQUID ACCUMULATOR AND HEAT EXCHANGE SYSTEM HAVING LIQUID ACCUMULATOR" in the China National Intellectual Property Administration, the content of which is hereby incorporated by reference.

TECHNICAL FIELDS

The present disclosure relates to a field of air conditioning technology, in particular, to a liquid accumulator and a heat exchange system having the liquid accumulator.

BACKGROUND

In traditional heat exchange systems, a liquid accumulator is usually disposed on a side of a compressor, and a gas-liquid mixture can be separated in the liquid accumulator and compressed in the compressor after separation. A problem after the compressor is shut down is that some of the high-pressure gas inside the compressor can flow through the liquid accumulator and discharge to other pipes or devices, which can increase the time for the compressor to start up again, thus affecting working efficiency.

SUMMARY

In view of the above, it is necessary to provide an improved liquid accumulator with a one-way valve, which prevents high-pressure gas inside the compressor to flow through the liquid accumulator and discharge to other pipes or devices. Therefore, a start-up time of the compressor can be shortened, working efficiency can be correspondingly improved, and air conditioning systems applying the liquid accumulator can have a wider application prospect.

The present disclosure provides a liquid accumulator including a barrel body, and the barrel body includes an inlet end disposed at one end of the barrel body and an outlet end disposed at the other end of the barrel body. The liquid accumulator further includes a one-way valve disposed in the barrel body, and the one-way valve includes a valve seat and a valve plate. The valve seat is provided with a valve port, a side of the valve seat towards the outlet end is provided with the valve plate, and the valve port is covered by the valve plate. Furthermore, a protrusion is arranged on a side of the valve seat towards the valve plate, the protrusion surrounds the valve port, and the valve plate is capable of abutting against the protrusion or moving away from the protrusion, so as to open or close the one-way valve. Alternatively, a protrusion is arranged on a side of the valve plate towards the valve seat, the protrusion surrounds the valve port, and the valve plate is capable of abutting against the valve port or moving away from the valve port, so as to close or open the one-way valve.

In this way, the one-way valve is provided in the barrel body, so that only a fluid refrigerant, which enters in the liquid accumulator from the inlet end, can be prevented from flowing out to other devices.

In order to ensure that the valve plate can move away and near to the valve seat, the liquid accumulator further includes a fixing assembly, which extends through the valve seat and the valve plate, and the valve plate is capable of abutting against the valve seat or moving away from the valve seat on the fixing assembly.

In this way, the fixing assembly can extend through the valve seat and the valve plate, so that the valve plate is capable of abutting against the valve seat or moving away from the valve seat.

In order to enable the valve plate to abut against the protrusion on the valve seat in general conditions, the liquid accumulator further includes an elastic member. The elastic member is sleeved on the fixing assembly, an end of the elastic member is connected to the valve plate, and the other end of the elastic member is connected to the fixing assembly, so as to make the valve plate abut against the protrusion or the valve port.

In this way, it enables the valve plate to abut against the protrusion via the elastic member, so that the one-way valve can be kept in a closed state in general conditions.

In order to make the fixing assembly extend through the valve seat and the fluid refrigerant flow towards the outlet end via the valve port, the valve seat is provided with a first mounting hole, and the first mounting hole extends through the valve seat. The valve seat is provided with a plurality of valve ports extending through the valve seat, and the plurality of valve ports are uniformly disposed along a circumference around the first mounting hole as a center.

In this way, the valve seat can be sleeved on the fixing assembly via the first mounting hole, and the fluid refrigerant can uniformly flow to the outlet end via the uniformly disposed valve port.

In order to make the valve plate cover the valve port, and the valve plate cooperate with the protrusion to close the valve port, the valve plate is provided with a second mounting hole through the valve plate, the first mounting hole and second mounting hole are correspondingly arranged, and an area of the valve plate is larger than or equal to an area surrounded by the protrusion.

In this way, the valve plate can cover the valve port, and the valve plate can cooperate with the protrusion to close the valve port.

In order to make a bottom of the one-way valve fixedly mounted on the barrel body, the liquid accumulator further includes a baffle, the baffle is provided with an accommodating hole and a second circulation hole, and the fixing assembly extends through the accommodating hole.

In this way, the baffle can be mounted on the barrel body, thus making the bottom of the one-way valve fixedly mounted on the liquid accumulator, and the elastic member easy to abut.

In order to enable various working units to be installed in the barrel body, an inner wall of the barrel body is provided with a mounting groove and a clamping groove. The mounting groove and the clamping groove are fixed at different heights on the barrel body, and the valve seat is fixed in the mounting groove.

In this way, the mounting groove and the clamping groove can be provided on the barrel body, so that various working units can be installed in the barrel body.

In order to enable the valve seat to be stably mounted in the barrel body, the valve seat is fixed to the barrel body by a welding process.

In this way, the valve seat can be fixedly mounted in the barrel body by means of a welding connection.

In order to enable the liquid accumulator to filter impurities in the fluid refrigerant, the liquid accumulator further includes a filter assembly, the filter assembly is disposed between the inlet end and the valve seat, and the filter assembly is fixed in the clamping groove.

In this way, impurities in the fluid refrigerant can be filtered by the filter assembly, thus making the fluid refrigerant pure and protecting the compressor.

The present disclosure further provides a heat exchange system including the above liquid accumulator.

In the present disclosure, the one-way valve is provided in the barrel body of the liquid accumulator. In this way, high-pressure gas inside the compressor can be avoided to flow out from the liquid accumulator and to other pipes or devices. Therefore, start-up time of the compressor can be shortened, and working efficiency can be correspondingly improved, and air conditioning systems applying the liquid accumulator have a wider application prospect.

In the figures, 100 represents a liquid accumulator, 10 represents a barrel body, 11 represents a mounting groove, 12 represents an inlet end, 13 represents an outlet end, 14 represents a clamping groove, 20 represents an one-way valve, 21 represents a valve seat, 211 represents a valve port, 212 represents a first mounting hole, 213 represents a protrusion, 22 represents a valve plate, 221 represents a second mounting hole, 222 represents a valve core, 2221 represents a third mounting hole, 23 represents a fixing assembly, 231 represents a screw, 232 represents a sliding column, 24 represents an elastic member, 30 represents a filter assembly, 31 represents a filter screen, 32 represents a mounting frame, 321 represents a first circulation hole, 40 represents an inlet pipe, 50 represents an outlet pipe, 51 represents an air outlet pipe, 60 represents a baffle, 61 represents an accommodating hole, and 62 represents a second circulation hole.

DETAILED DESCRIPTION

The technical solutions in the embodiments of the present disclosure are clearly and completely described in the following with reference to the accompanying drawings in the embodiments of the present disclosure. It is obvious that the described embodiments are only a part of the embodiments, but not all of the embodiments. All other embodiments obtained by those skilled in the art based on the embodiments of the present disclosure without departing from the inventive scope are the scope of the present disclosure.

It should be noted that when an element is referred to as being "mounted" on another element, it may be directly mounted on the other element or a further element may be presented between them. When an element is considered to be "disposed" on another element, it may be directly disposed on the other element or a further element may be presented between them. When an element is referred to as being "fixed" to another element, it may be directly fixed to the other element or a further element may be presented between them.

Unless otherwise defined, all technical and scientific terms used herein have the same meaning as a skilled person in the art would understand. The terminology used in the description of the present disclosure is for the purpose of describing particular embodiments and is not intended to limit the disclosure. The term "or/and" as used herein includes any and all combinations of one or more of the associated listed items.

An one-way valve is mainly used in fluid pipelines, the one-way valve is in a closed state under general conditions, and in an open state when a pressure at an inlet end of the one-way valve is greater than that at an outlet end, so as to allow a fluid to flow from the inlet end with a high pressure to the outlet end with a low pressure via the one-way valve. The one-way valve can be used in the fluid pipelines, so that the fluid can only circulate in one direction, and bidirectional circulation can be avoided.

Figure 1:
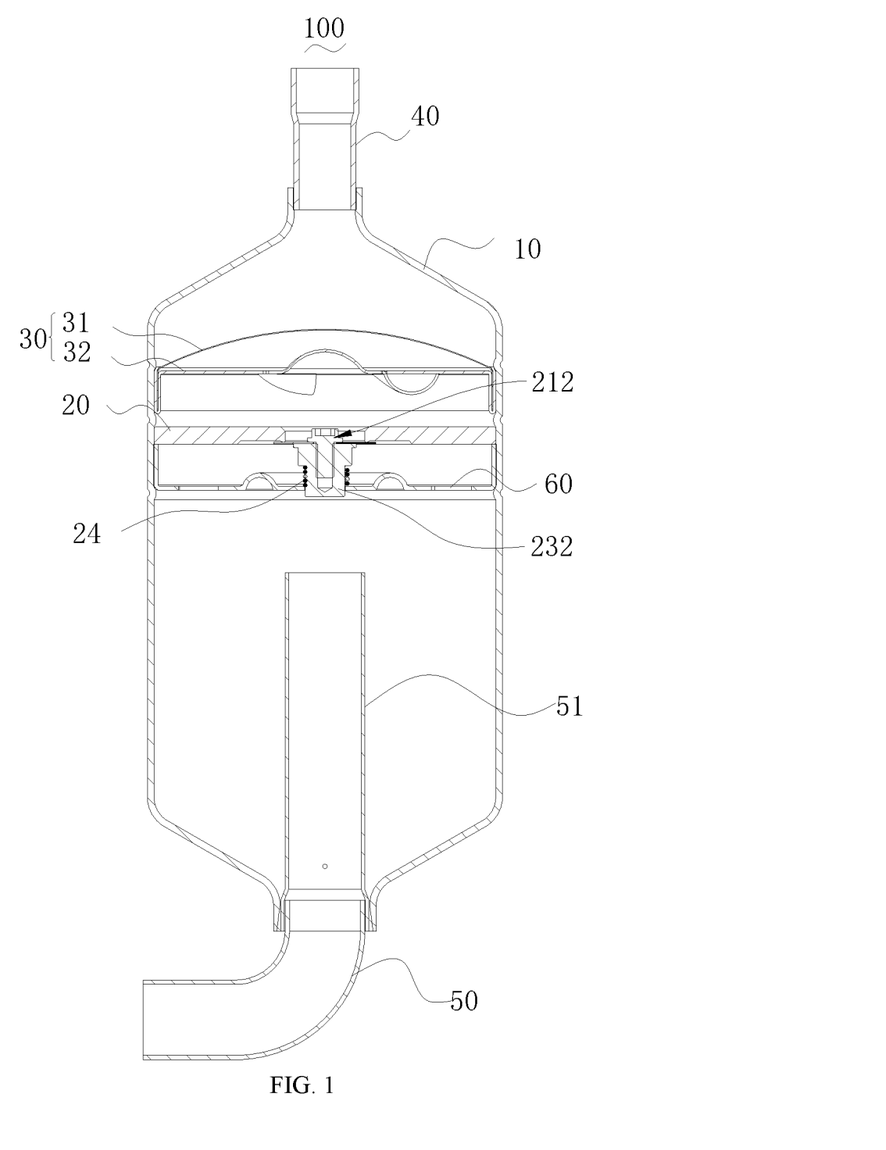
FIG. 1 is a structural schematic view of a liquid accumulator in an embodiment of the present disclosure.
Figure 4:
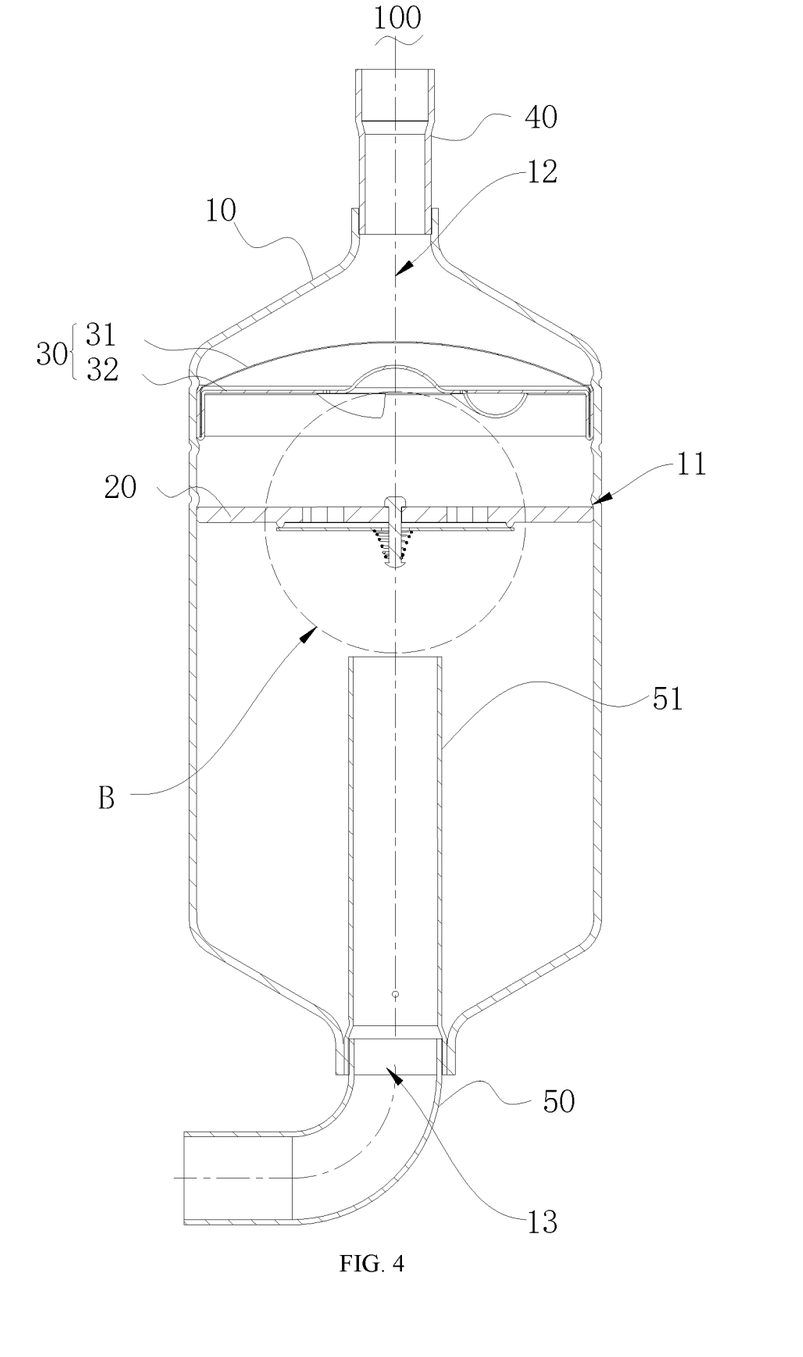
FIG. 4 is a structural schematic view of a liquid accumulator in another embodiment of the present disclosure.

FIG. 1 is a structural schematic view of a liquid accumulator 100 in an embodiment of the present disclosure, and FIG. 4 is a structural schematic view of a liquid accumulator 100 in another embodiment of the present disclosure.

In the present disclosure, a one-way valve 20 can be disposed in a barrel body 10 of the liquid accumulator 100, so that only the fluid entering from the inlet end 12 in the liquid accumulator can flow forward/in one direction, and the fluid can be prevented from flowing backwards.

It is understood that a use and a construction of the one-way valve 20 are not limited in the present disclosure, and in other embodiments, the one-way valve 20 can also be used in hydraulic devices, urban pipeline installation devices and other fluidic devices, as long as the one-way valve 20 has beneficial effects in the devices.

In the prior art, a liquid accumulator is usually disposed on one side of a compressor, a gas-liquid mixture can be separated in the liquid accumulator, and compressed in the compressor after separated. After the compressor is shut down, some of high-pressure gas inside the compressor can flow through the liquid accumulator and be discharged to other pipes or devices via the liquid accumulator, which can cause the compressor to take longer time to start up again, thus affecting working efficiency.

To solve the above technical problems, it is necessary to provide an improved liquid accumulator in the present disclosure, in which the one-way valve is provided. In this way, the high-pressure gas inside the compressor can be prevented to flow through the liquid accumulator and be discharged to other pipes or devices. Therefore, start-up time of the compressor can be shortened, working efficiency can be improved, and air conditioning systems applying the liquid accumulator have a wider application prospect.

In an embodiment, the liquid accumulator 100 includes a barrel body 10 disposed on one side of the compressor, and the fluid can flow into the compressor via the barrel body 10.

Referring to FIG. 1, in the present embodiment, the barrel body 10 is substantially cylindrical, and provided with a first end and a second end, which are disposed opposite to each other. The first end is defined as the inlet end 12, and the second end is defined as the outlet end 13, a fluid refrigerant including gas-liquid mixture can flow into the liquid accumulator 100 from the inlet end 12 and flow out of the liquid accumulator 100 via the outlet end 13.

It is understood that the present disclosure does not limit a structure of the barrel body 10. And in other embodiments, the barrel body 10 can be in cuboid-shaped, as long as the fluid refrigerant including gas-liquid mixture can flow into the liquid accumulator 100 from the inlet end 12 and flow out of the liquid accumulator 100 via the outlet end 13.

Referring to FIG. 1, in the present embodiment, an inner wall of the barrel body 10 can be also provided with a mounting groove 11, and the mounting groove 11 can be disposed along a circumference of the inner wall of the barrel body 10 to form an annular mounting groove 11 inside the barrel body 10.

Specifically, the inner wall of the barrel body 10 is provided with a plurality of mounting grooves 11 surrounding the interior of the barrel body 10 along an axial direction thereof.

It is understood that the present disclosure does not limit a way of setting the mounting groove 11, in other embodiments, a plurality of mounting grooves 11 can be provided at intervals on the same horizontal plane, as long as working units/members can be fixedly installed in the mounting groove 11.

In an embodiment of the present disclosure, the liquid accumulator 100 can be further provided with a filter assembly 30. The filter assembly 30 can be disposed in the liquid accumulator 100, and configured to filter impurities in the refrigerant passing through the liquid accumulator 100, so that the refrigerant can remain pure when flowing into the compressor and protects the compressor.

Figure 2:
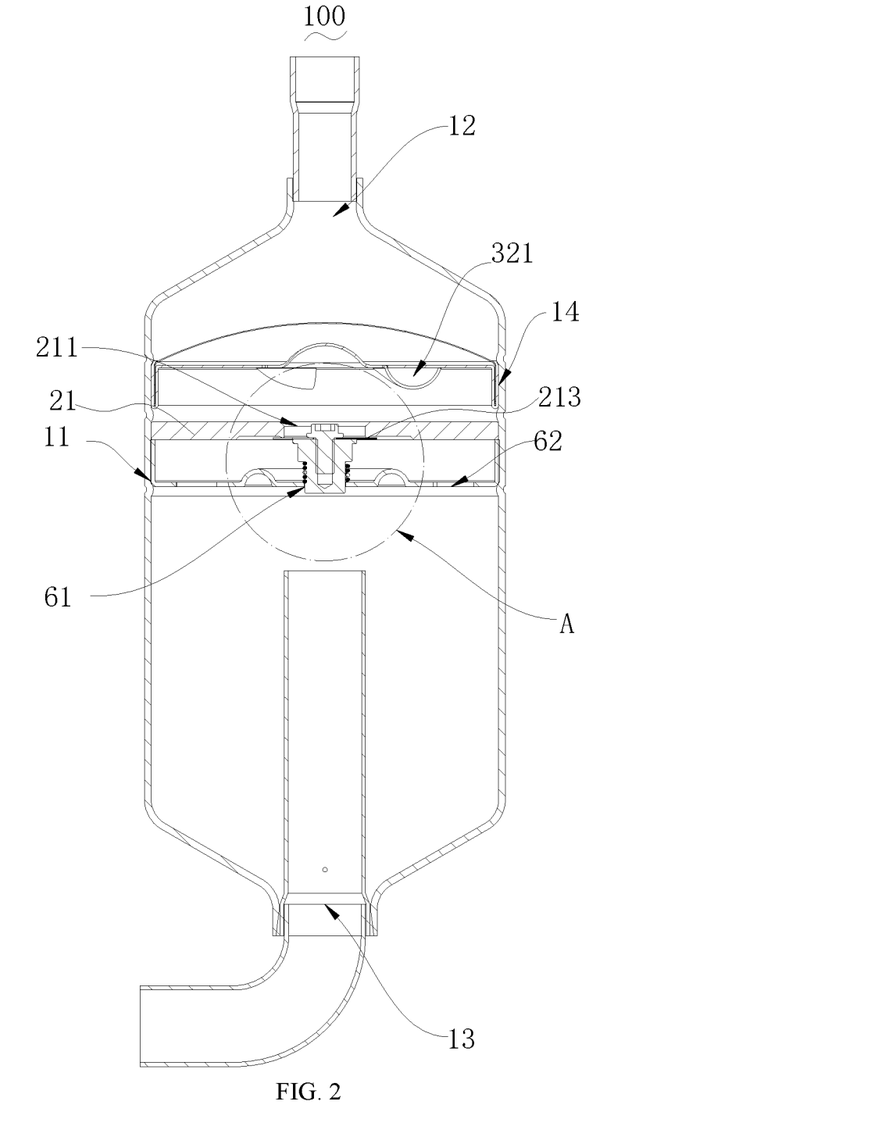
FIG. 2 is a structural schematic view of the liquid accumulator of FIG. 1.

FIG. 1 is the structural schematic view of the liquid accumulator 100 in an embodiment of the present disclosure, FIG. 2 is a structural schematic view of the liquid accumulator of FIG. 1 and FIG. 4 is a structural schematic view of a liquid accumulator in another embodiment of the present disclosure.

In the present embodiment, the filter assembly 30 can be disposed on a side of the barrel body 10 near the inlet end 12, a raised portion of the filter assembly 30 can be towards the inlet end 12, and the filter assembly 30 can be clamped to the mounting groove 11 on the barrel body 10.

It is understood that the present disclosure does not limit a way of installation of the filter assembly 30. And in other embodiments, the filter assembly 30 can be fixedly installed in the barrel body 10 by ways of a hanging buckle.

In the present embodiment, the filter assembly 30 can include a filter screen 31 and a mounting frame 32, the filter screen 31 can be substantially in arc-shaped, and the filter screen 31 can be disposed on the mounting frame 32 and protrude towards the inlet end 12. The mounting frame 32 can be provided with a first circulation hole 321, and the mounting frame 32 can be clamped to the mounting groove 11 on the barrel body 10, so that the filter screen 31 can be fixedly installed in the barrel body 10 by the mounting frame 32.

It is understood that the present disclosure does not limit a way of setting the filter screen 31. And in other embodiments, the filter screen 31 can be tightly attached to the mounting frame, so long as it enables the filter screen 31 to provide a filtering function for the refrigerant.

Figure 3:
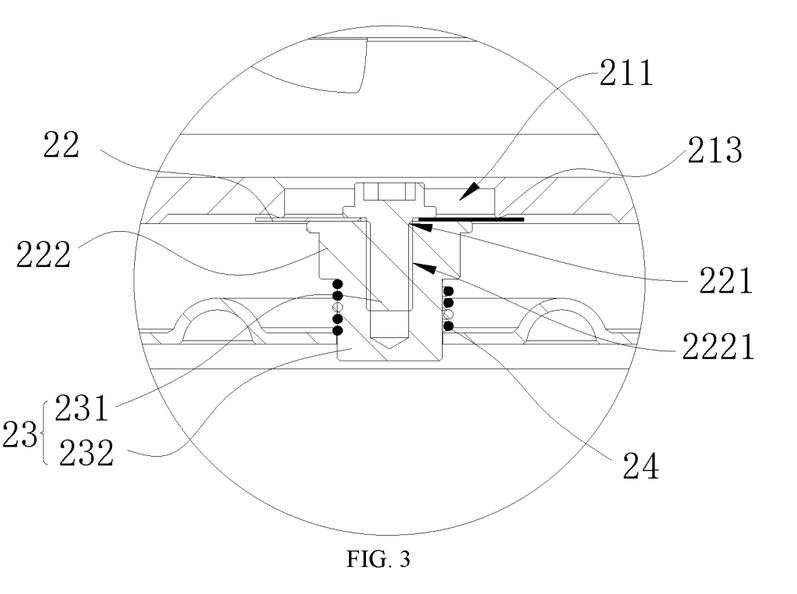
FIG. 3 is a partial enlarged view of portion "A" of the liquid accumulator of FIG. 2.

FIG. 3 is a partial enlarged view of portion "A" of the liquid accumulator of FIG. 2. In an embodiment provided in the present disclosure, the one-way valve 20 includes a valve seat 21, and the valve seat 21 can be installed between the filter assembly 30 and outlet end 13. The valve seat 21 is configured for installing the one-way valve 20, so that the refrigerant can only flow from the inlet end 12 to the outlet end 13.

In the present embodiment, the valve seat 21 is substantially in circular-shaped, an area of the valve seat 21 can be equal to a cross-sectional area of the barrel body 10, and the valve seat 21 can be installed in the mounting groove 11 inside the barrel body 10, so that the valve seat 21 can completely seal the barrel body 10.

It is understood that the present disclosure does not limit a location of the valve seat 21, in other embodiments, the valve seat 21 can be installed between the filter assembly 30 and the inlet end 12, as long as it is possible to install the one-way valve 20 on the valve seat 21.

In an embodiment, the valve seat 21 can be provided with a first mounting hole 212, and the first mounting hole 212 can be configured to mount the fixing assembly 23.

In the present embodiment, the first mounting hole 212 can be provided in the middle of the valve seat 21, and the first mounting hole 212 can be configured to extend through the valve seat 21.

It is understood that the present disclosure does not limit a location of the first mounting hole 212, and in other embodiments, the first mounting hole 212 can be disposed at a position deviating from the middle of the valve seat 21, as long as the fixing assembly 23 can be disposed on the first mounting hole 212.

In an embodiment, a valve port 211 can be provided on the valve seat 21, and the valve port 211 can be configured to communicate spaces on both sides of the valve seat 21, so that the refrigerant can flow to the outlet end 13 via the valve port 211.

Referring to FIG. 3, in the present embodiment, the valve seat 21 can be provided with a plurality of valve ports 211 extending through the valve seat 21, the plurality of valve ports 211 can be uniformly disposed along a circumference around the first mounting hole 212 as a center, and the valve port 211 can be in communication with spaces on both sides of the valve seat 21.

In other embodiments, the valve ports 211 on the valve seat 21 can be uniformly disposed along a radial direction of a cross section thereof, and extend through the valve seat 21.

It is understood that the present disclosure does not limit a location of the valve port 211, and in other embodiments, the valve port 211 can be disposed in an array on the valve seat 21, as long as the valve port 211 can be in communication with spaces on both sides of the valve seat 21.

Referring to FIG. 3, in an embodiment provided in the present disclosure, the valve seat 21 can be further provided with a protrusion 213, which can be configured to seal a space between the valve seat 21 and the outlet end 13, so as to prevent gas/fluid backflow.

In the present embodiment, the protrusion 213 can be disposed on a side of the valve seat 21 towards the outlet end. The protrusion 213 can surround the valve port 211 and a top portion of the protrusion 213 can be in arc-shaped, so that the protrusion 213 can be defined a circle, and enclose the valve port 211 within the protrusion 213.

In other embodiments, the top portion of the protrusion 213 can be in triangular-shaped.

It is understood that the present disclosure does not limit a shape of the protrusion 213, and in other embodiments, the cross-section of the protrusion 213 can be in trapezoidal-shaped, as long as it enables the protrusion 213 to seal the space between the valve seat 21 and the outlet end 13, so as to prevent gas/fluid backflow.

Referring to FIG. 3, in the present embodiment, the one-way valve 20 further includes a valve plate 22, and the valve plate 22 can be disposed on the fixing assembly 23. The valve plate 22 can be configured to match with the protrusion 213 on the valve seat 21 to seal the space between the valve seat 21 and the outlet end 13, so as to prevent gas/fluid backflow.

Referring to FIG. 3, in the present embodiment, the valve plate 22 can be substantially in circular-shaped, and a middle portion of the valve plate 22 can be provided with a second mounting hole 221 extending through the valve plate 22. The second mounting hole 221 can be disposed corresponding to the first mounting hole 212 on the valve seat 21, the valve plate 22 can be disposed on the fixing assembly 23 via the second mounting hole 221, and slide on the fixing assembly 23. An area of the valve plate 22 is larger than an area surrounded by the protrusion 213, and the valve plate 22 can match with the protrusion 213 to form a sealed space, so that two sides of the valve seat 21 can be isolated from each other via the cooperation of the valve plate 22 and the protrusion 213. The valve plate 22 can be matched with the protrusion 213, and the valve port 211 can be closed when the valve plate 22 and the protrusion 213 abut against each other, and opened when the valve plate 22 is away from the protrusion 213.

It is understood that the present disclosure does not limit the shape of the valve plate 22. And in other embodiments, the valve plate 22 can also be in square-shaped, as long as the valve plate 22 can abut against the protrusion 213 and close the valve port 211.

It should be noted that the valve plate 22 and the protrusion 213 are disposed on a side of the valve seat 21 towards the outlet end 13, and the side of the valve seat 21 towards the outlet end 13 can be in communication with the compressor, so that the side is always filled with the high-pressure gas. The high-pressure gas can push the valve plate 22 along a direction towards the valve seat 21, so that the valve plate 22 and the protrusion 213 can continuously abut against each other. The valve plate 22 can be in line contact with the protrusion 213 when the one-way valve 20 is on work, and in surface contact after long-time pushing, thereby improving sealing performance of the one-way valve 20.

Figure 5:
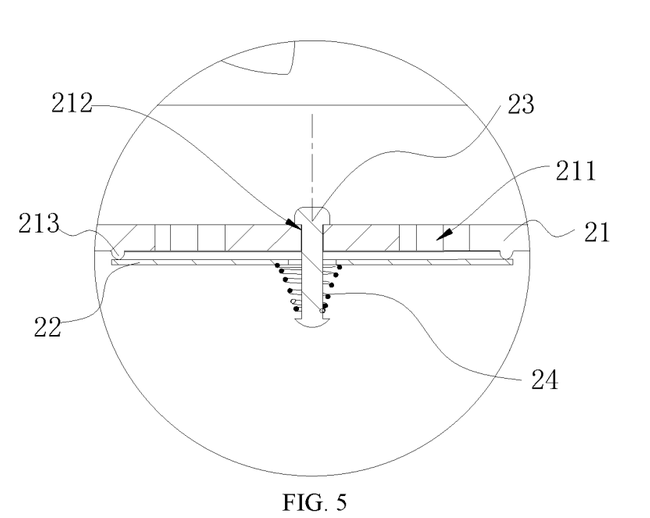
FIG. 5 is a partial enlarged view of portion "B" of the liquid accumulator of FIG. 4.

In the present embodiment, the protrusion 213 can be disposed on a side of the valve plate 22 towards the valve seat 21, the protrusion 213 is configured to surround the valve port 211, and the area surrounded by the protrusion 213 is larger than an area of the valve port 211. The protrusion 213 on the valve plate 22 can be matched with the valve seat 21 to form a sealed space, so that two sides of the valve seat 21 can be isolated from each other via the cooperation of the protrusion 213 on the valve plate 22 and the valve seat 21. The valve port 211 can be closed when the valve plate 22 and the valve seat 21 abut against each other, and opened when the valve plate 22 is away from the valve seat 21.

It should be noted that the valve plate 22 is disposed on the side of the valve seat 21 towards the outlet end 13, the protrusion 213 is disposed on a side of the valve plate 22 towards the valve seat 21, and the side of the valve seat 21 towards the outlet end 13 can be in communication with the compressor, so that the side of the valve seat 21 towards the outlet end 13 is always filled with the high-pressure gas. The high-pressure gas can push the valve plate 22 along a direction towards the valve seat 21, so that the valve seat 21 and the protrusion 213 can continuously abut against each other. The valve seat 21 can be in line contact with the protrusion 213 when the one-way valve 20 is on work, and in surface contact after long-time pushing, thereby improving the sealing performance of the one-way valve 20.

In the present embodiment, the one-way valve 20 can further include the fixing assembly 23, and the fixing assembly 23 can be configured to extend through the first mounting hole 212, so that the valve plate 22 can be slidably mounted on the fixing assembly 23.

FIG. 5 is a partial enlarged view of portion "B" of the liquid accumulator of FIG. 4, in the present embodiment, there can be one fixing assembly 23, and the fixing assembly 23 can be in a long cylindrical shape. Circular protrusions can be protruded from two ends of the fixing assembly 23, a cross sectional area of the circular protrusions can be larger than that of the fixing assembly 23, and one end of the fixing assembly 23 can be fixedly mounted in the first mounting hole 212 of the valve seat 21, and the other end of the fixing assembly 23 can be towards the outlet end 13.

It is understood that the present disclosure does not limit the structure of the fixing assembly 23, and in other embodiments, there can be a plurality of fixing assemblies 23, and the valve seat 21 can be also provided with a plurality of first mounting holes 212, as long as the valve plate 22 can be slidably mounted on the fixing assembly 23.

FIG. 1 is a structural schematic view of a liquid accumulator 100 in an embodiment of the present disclosure, FIG. 2 is a structural schematic view of the liquid accumulator 100 of FIG. 1, and FIG. 3 is a partial enlarged view of portion "A" of the liquid accumulator of FIG. 2. In an embodiment, the one-way valve 20 can further include the fixing assembly 23, and the fixing assembly 23 can extend through the first mounting hole 212, so that the valve plate 22 can be slidably mounted on the fixing assembly 23.

Referring to FIG. 3, in the present embodiment, the fixing assembly 23 can be a screw 231 and a sliding column 232, and the screw 231 can fit with the sliding column 232. A threaded hole can be provided inside the sliding column 232. And the screw 231 is able to extend through the first mounting hole 212 on the valve seat 21 and threadedly connected to the threaded hole in the sliding column 232, so as to fixedly mount the sliding column 232 on the valve seat 21.

It is understood that the present disclosure does not limit a way of arranging the fixing assembly 23, in other embodiments, one end of the fixing assembly 23 can be fixedly mounted in the valve seat 21, and the other end of the fixing assembly 23 can be towards the inlet end 12, as long as the valve plate 22 can slide on the fixing assembly 23 relative to the valve seat 21.

The one-way valve 20 can further include a valve core 222, and the valve plate 22 can be disposed on the fixing assembly 23. The valve plate 22 can be configured to match with the protrusion 213 on the valve seat 21 to seal the space between the valve seat 21 and the outlet end 13, so as to prevent gas/fluid backflow.

Referring to FIG. 3, in the present embodiment, the one-way valve 20 can further include a valve core 222, the middle portion of the valve plate 22 can be provided with the second mounting hole 221 extending through the valve plate 22, and a middle portion of the valve core 222 can be correspondingly provided with a third mounting hole 2221. The valve plate 22 and the valve core 222 can be sleeved on the sliding column 232, and the valve core 222 and the valve plate 22 on the sliding column 232 can be away from or near to the valve seat 21. The valve plate 22 can match with the protrusion 213, and the valve port 211 can be closed when the valve plate 22 and the protrusion 213 abut against each other, and opened when the valve plate 22 is away from the protrusion 213.

It is understood that the present disclosure does not limit a way of installation of the valve plate 22. In other embodiments, the valve plate 22 can be provided with the same protrusion 213 as that on the valve seat 21, which can abut against the valve seat 21 to close the valve port 211, as long as the valve plate 22 can relatively close the valve port 211.

Referring to FIG. 1 to FIG. 2, in an embodiment of the present disclosure, the one-way valve 20 can further include a baffle 60, and the baffle 60 can be disposed inside the barrel body 10, and configured to abut against an end of an elastic member 24, so that the elastic member 24 can be stable to mount.

In the present embodiment, the baffle 60 can be in circular-shaped, and a middle portion of the baffle 60 can be provided with an accommodating hole 61 for accommodating the sliding column 232. One end of the elastic member 24 can abut against the baffle 60, and the other end of the elastic member 24 can abut against the valve core 222. The baffle 60 can be provided with a plurality of second circulation holes 62, the plurality of second circulation holes can be uniformly disposed along a circumference around the accommodating hole 61 in the middle of the baffle 60, and the refrigerant can flow to the outlet end via the plurality of second circulation holes. The baffle 60 can be fixedly mounted in the mounting groove 11 of the barrel 10, so as to be fixedly mounted on the barrel 10.

It is understood that the present disclosure does not limit the shape of the baffle 60. In other embodiments, the baffle 60 can be a strip-shaped plate, the baffle 60 can be provided with an accommodating hole 61 for accommodating the sliding column 232 to mount. In addition, the baffle 60 can abut against an end of the elastic member 24, so long as the baffle 60 can abut against the elastic member 24.

In an embodiment of the present disclosure, the one-way valve 20 can further include an elastic member 24 sleeved on the fixing assembly 23, and the elastic member 24 can be configured to abut against the valve plate 22, so that the valve plate 22 can always abut against the protrusion 213 on the valve seat 21.

Referring to FIG. 3, in the present embodiment, the elastic member 24 can be sleeved on the sliding column 232, and one end of the elastic member 24 can abut against the baffle 60, and the other end of the elastic member 24 abut against the valve core 222. The elastic member 24 can enable the valve plate 22 fixedly connected to the valve core 222 to always abut against the protrusion 213 on the valve seat 21, so that the one-way valve 20 can remain in a closed state in general conditions.

Referring to FIG. 5, in the present embodiment, the elastic member 24 can be sleeved on the fixing assembly 23, one end of the elastic member 24 can abut against the valve plate 22, and the other end of the elastic member 24 can abut against an end of the fixing assembly 23. The elastic member 24 can enable the valve plate 22 to abut against the protrusion 213 on the valve seat 21 all the time, so that the one-way valve 20 can remain in a closed state in general conditions.

Specifically, in the above two embodiments, the elastic member 24 can be a spring.

It is understood that the present disclosure does not limit a way of arranging the elastic member 24. In other embodiments, the elastic member 24 can be an elastic pressing plate, the elastic pressing plate can be fixedly mounted on the fixing assembly 23, and the valve plate 22 can abut against the protrusion 213 via the elastic pressing plate, as long as the valve plate 22 can abut against the protrusion 213 on the valve seat 21.

In an embodiment, the liquid accumulator 100 can further include an inlet pipe 40, and the inlet pipe 40 can be disposed on the inlet end 12, and configured to be connected to the inlet end 12 of the barrel body 10, so as to transfer the refrigerant into the liquid accumulator 100.

In the present embodiment, the inlet pipe 40 can be in step-shaped, and the inlet pipe 40 can be sleeved on the inlet end 12

It is understood that in other embodiments, the inlet pipe 40 can also be other types of pipes, for example, a straight-cylinder pipe, as long as the refrigerant can be transferred into the liquid accumulator 100.

In an embodiment of the present disclosure, the liquid accumulator 100 can further include an outlet pipe 50, the outlet pipe 50 can further include an air outlet pipe 51 configured to separate a gas from liquid in the refrigerant, and the outlet pipe 50 can be configured to discharge a gaseous refrigerant.

In the present embodiment, the air outlet pipe 51 can be internally connected to the outlet end 13 of the barrel body 10, and a length of the air outlet pipe 51 can be slightly smaller than a length between the one-way valve 20 and the outlet end 13. The outlet pipe 50 can be externally connected to the outlet end 13 of the barrel body 10 and in communication with the air outlet pipe 51. The liquid accumulator 100 can be provided with the air outlet pipe 51, so that the liquid accumulator 100 have a gas-liquid separation function, and the gaseous refrigerant can be discharged via the outlet pipe 50.

It can be understood that in other embodiments, the air outlet pipe 51 in the outlet pipe can also be in other shapes, for example, a funnel-shaped air outlet pipe 51, as long as the gaseous refrigerant can be transferred by the air outlet pipe 51.

A flow process of the fluid in the liquid accumulator can be specifically described below.

Flow process is shown as following. The fluid refrigerant including gas-liquid mixture can flow into the liquid accumulator 100 via the inlet pipe 40. Firstly, the fluid refrigerant can flow through the filter screen 31 to filter impurities contained in the fluid refrigerant. After flowing out from the filter screen 31, the refrigerant can flow out from the first circulation hole 321 of the mounting frame 32 and flow to the one-way valve 20. When the pressure near to a side of the outlet end 13 is less than that of the inlet end 12, the one-way valve 20 can be opened, the refrigerant can flow through the one-way valve 20 and flow to the outlet end 13. In which a liquid refrigerant can sink to a bottom of the liquid accumulator 100, and the gaseous refrigerant can flow into the compressor from the outlet end 13. When the compressor is shut down, the high-pressure gas can flow out of the compressor, and the one-way valve 20 can prevent the high-pressure gas from flowing from the liquid accumulator 100 to other devices.

The one-way valve can be provided in the barrel body 10 of the liquid accumulator 100, high-pressure gas inside the compressor can be prevented to flow through the liquid accumulator 100 and discharged to other pipes or devices. Therefore, the start-up time of the compressor can be shortened, working efficiency can be improved, and air conditioning systems applying the liquid accumulator have a wider application prospect.

The present disclosure further provides a heat exchange system including the liquid accumulator mentioned above.

The heat exchange system provided in the present disclosure can include a first heat exchanger, a second heat exchanger, a gas-liquid separator, a compressor, and a liquid accumulator. The refrigerant can be liquefied by the first heat exchanger, and the obtained liquid refrigerant can flow to the second heat exchanger, be cooled and depressurized in the second heat exchanger, then enter the gas-liquid separator directly, and return to the compressor via the liquid accumulator. The liquid accumulator 100 is provided in the present disclosure, so that the heat exchange system can be quickly started and run, thereby reducing the start-up time and improving the working efficiency.

The technical features of the above-described embodiments may be combined in any combination. For the sake of brevity of description, not all possible combinations of the technical features in the above embodiments are described. However, as long as there is no contradiction between the combinations of these technical features, all should be considered as within the scope of this disclosure.

It should be realized by those skilled in the art that the above embodiments are only used to illustrate the present disclosure, and not intended to limit the present disclosure, and variations and modifications may be made by those skilled in the art without departing from the spirit and scope of the disclosure, and these variations and modifications belong to the scope of the claimed disclosure.

We claim:

1. A liquid accumulator, comprising a barrel body, wherein the barrel body comprises an inlet end disposed at one end of the barrel body and an outlet end disposed at the other end of the barrel body,
    wherein the liquid accumulator further comprises a one-way valve disposed in the barrel body, and the one-way valve comprises a valve seat and a valve plate,
    the valve seat is provided with a valve port, a side of the valve seat towards the outlet end is provided with the valve plate, the valve port is covered by the valve plate, and
    a protrusion is located surrounding the valve port and the valve plate is capable of moving towards or away from the valve port, so as to open or close the one-way valve;
    the valve seat is provided with a first mounting hole, the first mounting hole extends through the valve seat, the valve seat is provided with a plurality of valve ports extending through the valve seat, and the plurality of valve ports are uniformly disposed along a circumference around the first mounting hole as a center.

2. The liquid accumulator of claim 1, wherein the protrusion is arranged on a side of the valve seat towards the valve plate, the protrusion surrounds the valve port, the valve plate is capable of abutting against the protrusion or moving away from the protrusion, so as to open or close the one-way valve.

3. The liquid accumulator of claim 1, wherein the protrusion is arranged on a side of the valve plate towards the valve seat, the protrusion surrounds the valve port, and the valve plate is capable of abutting against the valve port or moving away from the valve port, so as to close or open the one-way valve.

4. The liquid accumulator of claim 1, further comprising a fixing assembly, wherein the fixing assembly extends through the valve seat and the valve plate, the valve plate is fixed on an end of the fixing assembly, and the valve plate is capable of abutting against the valve seat or moving away from the valve seat via the fixing assembly.

5. The liquid accumulator of claim 4, further comprising an elastic member, wherein the elastic member is sleeved on the fixing assembly, an end of the elastic member is connected to the valve plate, and the other end of the elastic member is connected to the fixing assembly, so as to make the valve plate abut against the protrusion or the valve port.

6. The liquid accumulator of claim 4, wherein the first mounting hole is configured to accommodate the fixing assembly.

7. The liquid accumulator of claim 6, wherein the valve plate is provided with a second mounting hole extending through the valve plate, the first mounting hole and the second mounting hole are correspondingly arranged, and an area of the valve plate is larger than or equal to an area surrounded by the protrusion.

8. The liquid accumulator of claim 4, further comprises a baffle, wherein the baffle is provided with an accommodating hole and a second circulation hole, and the fixing assembly extends through the accommodating hole.

9. The liquid accumulator of claim 1, wherein an inner wall of the barrel body is provided with a mounting groove and a clamping groove, the mounting groove and the clamping groove are fixed at different heights on the barrel body, and the valve seat is fixed in the mounting groove.

10. The liquid accumulator of claim 1, wherein the valve seat is fixed to the barrel body by a welding process.

11. The liquid accumulator of claim 1, further comprising a filter assembly, the filter assembly is disposed between the inlet end and the valve seat, and the filter assembly is fixed in the barrel body.

12. A heat exchange system, comprising a liquid accumulator, wherein the liquid accumulator is the liquid accumulator of claim 1.

* * * * *